US 10,184,212 B2

(12) United States Patent
Choi et al.

(10) Patent No.: US 10,184,212 B2
(45) Date of Patent: Jan. 22, 2019

(54) COUPLING BODY USING Z-PIN

(71) Applicant: Korea Aerospace Research Institute, Daejeon (KR)

(72) Inventors: Ik Hyeon Choi, Daejeon (KR); Ho Sung Lee, Daejeon (KR); Gi Hyuk Choi, Daejeon (KR); In Hee Hwang, Daejeon (KR)

(73) Assignee: Korea Aerospace Research Institute (KR)

( * ) Notice: Subject to any disclaimer, the term of this patent is extended or adjusted under 35 U.S.C. 154(b) by 392 days.

(21) Appl. No.: 14/957,445

(22) Filed: Dec. 2, 2015

(65) Prior Publication Data

US 2016/0168788 A1 Jun. 16, 2016

(30) Foreign Application Priority Data

Dec. 12, 2014 (KR) .................. 10-2014-0179690

(51) Int. Cl.
*D07B 9/00* (2006.01)
*D07B 1/02* (2006.01)
(Continued)

(52) U.S. Cl.
CPC ............... *D07B 9/00* (2013.01); *B29C 65/02* (2013.01); *B29C 65/564* (2013.01); *B29C 66/112* (2013.01); *B29C 66/131* (2013.01); *B29C 66/24221* (2013.01); *B29C 66/534* (2013.01); *B29C 66/7212* (2013.01); *B29C 66/72141* (2013.01); *B29C 66/742* (2013.01); *B29C 70/222* (2013.01); *B29C 70/24* (2013.01); *B29C 70/86* (2013.01); *D07B 1/02* (2013.01); *D07B 1/12* (2013.01); *D07B 1/18* (2013.01); *F16C 3/026* (2013.01); *F16D 1/064* (2013.01); *B29C 57/12* (2013.01); *B29L 2031/30* (2013.01); *B29L 2031/737* (2013.01); *B29L 2031/75* (2013.01); *F16C 2326/06* (2013.01); *Y10T 29/49947* (2015.01); *Y10T 403/472* (2015.01)

(58) Field of Classification Search
CPC ............. Y10T 403/472; Y10T 403/471; Y10T 29/49947; B29C 65/564; B29C 66/131; F16D 1/064; F16C 3/026
USPC ..... 464/134, 181, 182; 24/122.6; 29/525.01; 403/267
See application file for complete search history.

(56) References Cited

U.S. PATENT DOCUMENTS

| 5,862,975 A * | 1/1999 | Childress ............... B23K 31/02 |
| 9,028,333 B2 * | 5/2015 | Lutz ........................ F16C 3/026 |
| | | 464/182 |
| 9,303,682 B2 * | 4/2016 | Sohl ........................ F16C 3/026 |

FOREIGN PATENT DOCUMENTS

| EP | 0307112 | 3/1989 |
| JP | 03-223520 | 10/1991 |

(Continued)

*Primary Examiner* — Greg Binda
(74) *Attorney, Agent, or Firm* — Thorpe North & Western, LLP

(57) ABSTRACT

Coupling body devices, including methods of making the same, are provided and described. A method of manufacturing a coupling body, for example, can include forming a tube by braiding nonmetal fibers, forming a flange by rolling inwards an end of the tube, providing a metallic connector, inserting at least one Z-pin in an end portion of the connector, and coupling the tube and the connector by inserting the Z-pin in the flange and performing a composite material forming process.

9 Claims, 4 Drawing Sheets

(51) Int. Cl.
*D07B 1/18* (2006.01)
*D07B 1/12* (2006.01)
*F16D 1/064* (2006.01)
*F16C 3/02* (2006.01)
*B29C 70/86* (2006.01)
*B29C 65/56* (2006.01)
*B29C 65/00* (2006.01)
*B29C 70/22* (2006.01)
*B29C 70/24* (2006.01)
*B29C 65/02* (2006.01)
*B29L 31/00* (2006.01)
*B29C 57/12* (2006.01)
*B29L 31/30* (2006.01)

(56) References Cited

FOREIGN PATENT DOCUMENTS

| | | |
|---|---|---|
| JP | 05-003626 U | 1/1993 |
| JP | H07-113413 A | 5/1995 |
| KR | 10-2012-0029089 | 3/2012 |
| KR | 10-2014-0095709 | 8/2014 |

* cited by examiner

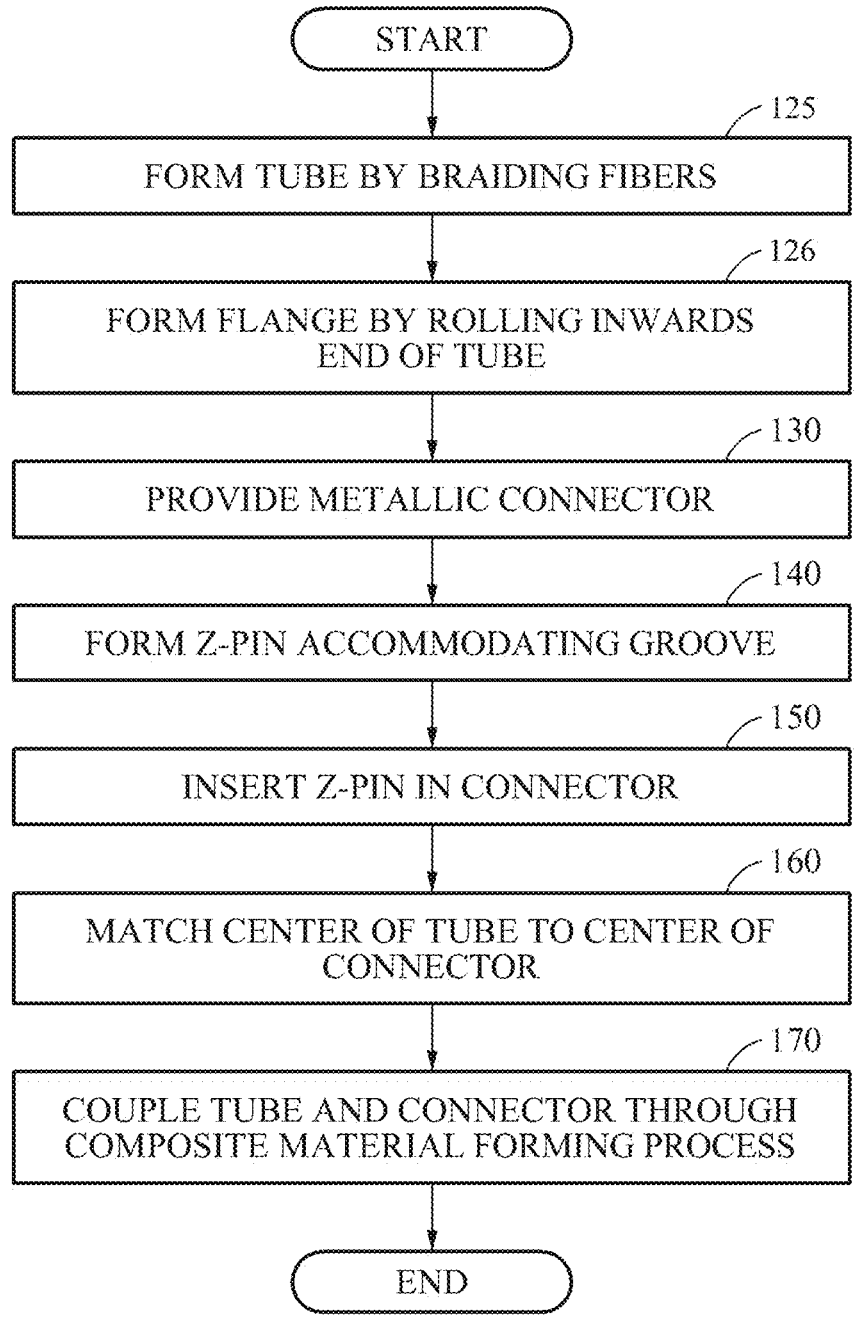

COUPLING BODY USING Z-PIN

CROSS-REFERENCE TO RELATED APPLICATION

This application claims the priority benefit of Korean Patent Application No. 10-2014-0179690, filed on Dec. 12, 2014, at the Korean Intellectual Property Office, the disclosure of which is incorporated herein by reference.

BACKGROUND

1. Field of the Invention

Embodiments relate to a coupling body using a Z-pin.

2. Description of the Related Art

To increase the fuel efficiency of a vehicle, active research is being conducted on a method of reducing the weight of a car body by replacing an existing metallic structural part of the vehicle with a polymer composite structural part having an enhanced specific stiffness and specific strength.

A drive shaft may be one of the structural parts to be replaced. The drive shaft transfers a driving force of an engine to a rotating force of wheels, and performs a main task of transferring torque while the shaft is rotating. For example, in a rear-wheel-drive vehicle, whirling-type vibrations may be generated from the rotation of the drive shaft because the drive shaft is long, and thus noise may occur and riding comfort may deteriorate. In addition, in the case of a long drive shaft, a non-productivity issue may occur because two short shafts need to be manufactured and a fixed supporting point needs to be additionally installed halfway between the shafts.

In contrast, using a carbon fiber-reinforced composite material may reduce production and assembling processes because the shafts are manufactured as a single component despite the length. Thus, the carbon fiber-reinforced composite material is known to be economically efficient despite the high price of carbon fiber.

In addition, such a composite drive shaft may make a vehicle more silent because it vibrates less, and may be more fuel efficient because it is lighter in weight. Applying a composite material to a drive shaft is something that is expected to be done for all vehicles in the near future as a measure to comply with regulations on fuel efficiency of a vehicle which are being tightened in developed countries including the United States of America.

A drive shaft has a central axis and connectors at opposite ends. In general, the portion to which a composite material is applied is a portion of the central axis. For the connectors at the ends, various forms are applied based on designs, and a metal material is generally used because the connectors include a portion in a complex form and a portion in which a stress is concentrated.

An existing metallic drive shaft may be used by welding a metallic axis and a metallic connector. Here, in a case of manufacturing the metallic axis as a composite material tube, connecting the tube to the metallic connector may be a core part of the technology. In existing technology, the composite material tube is manufactured through a filament winding method, and thus the tube may be manufactured in a single tube form.

For example, a tool bar for mounting a cutting tool disclosed in Korean Patent Publication No. 10-2012-0029089 includes a tool body and a metal covering. The tool body includes a gripping part, a tool mounting part in which the cutting tool is provided, and a supporting part configured to connect the gripping part and the tool mounting part, and is formed as a composite material. The metal covering includes two ends, and is wound around the outer face of the supporting part covering the outer face of the supporting part. The outer face of the supporting part includes a joint where the edges of the metal covering faces come in contact with each other.

SUMMARY

An aspect provides a coupling body to reduce costs of investment in equipment by using a braided woven product without using a filament winding method to manufacture a composite material tube portion.

In the coupling body, a Z-pin may be used without using a bolt in a portion connected to a flange.

In the coupling body, stress concentration that may be generated in a portion of the flange may be eliminated and cutting of a reinforced fiber due to a bolt hole may be prevented.

In the coupling body, a load may be evenly transferred to the portion connected to the flange, and thus a weight of the flange portion may be reduced According to an aspect, there is provided a coupling body including a tube formed by a plurality of nonmetal fibers being braided with one another, and of which an end portion includes a flange, and a metallic connector including an end portion corresponding to the flange. At least one Z-pin may be inserted in the end portion of the connector, and the connector and the tube may be coupled when the Z-pin is inserted in the end portion of the tube.

The nonmetal fibers may include a carbon fiber.

The end portion of the connector may include a Z-pin accommodating groove to indicate a location in which the Z-pin is to be inserted and facilitate the insertion.

The Z-pin may be coupled with the end portion of the connector through welding.

The flange may be formed by rolling inwards an end of the tube and spreading outwards the inwardly rolled end of the tube.

The coupling body may further include a metal skin covering an outer side of the tube and the connector in a coupled state.

The tube may be coated with a surface protection agent after the tube and the connector are coupled, and may have an increased impact resistance.

The connector may be provided in a flange form.

According to an aspect, there is provided a method of manufacturing a coupling body, the method including forming a tube by braiding a plurality of nonmetal fibers, forming a flange by rolling inwards an end of the tube and spreading outwards the inwardly rolled end of the tube, providing a metallic connector, inserting at least one Z-pin to an end portion of the connector, matching a center of the tube to a center of the connector, and coupling the tube and the connector by inserting the Z-pin in the flange.

After the providing of the connector, the method may further include forming a Z-pin accommodating groove in the end portion of the connector to indicate a location in which the Z-pin is to be inserted and facilitate the insertion.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a flowchart illustrating a method of manufacturing a coupling body according to an embodiment;

DETAILED DESCRIPTION

Figure 1:
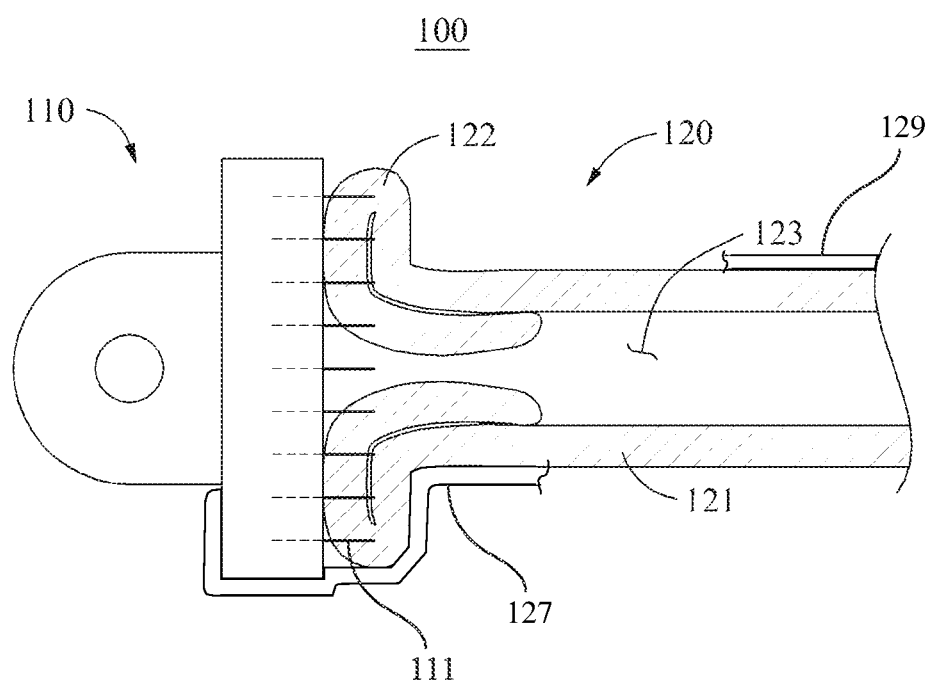
FIG. 1 is a perspective view of a coupling body in which a tube and a connector are coupled according to an embodiment.

Hereinafter, example embodiments are described with reference to the accompanying drawings, wherein like reference numerals refer to the like elements throughout. Also, it is noted that the disclosures in the claims are not limited by the example embodiments to be described below, and the configuration described in the example embodiments is not required for solving the example embodiments.

FIG. 1 is a perspective view of a coupling body 100 in which a tube 120 and a connector 110 are coupled according to an embodiment. A broken line illustrated in FIG. 1 indicates a presence of an internal hollow space of the tube 120.

The coupling body 100 includes the tube 120 including a flange 122 formed by nonmetal fibers braided with one another, and the connector 110 of a metal material including an end portion corresponding to the flange 122. At least one Z-pin 111 is inserted in the end portion of the connector 110, and the connector 110 is coupled with the tube 120 through the Z-pin 111 being inserted in the flange 122 of the tube 120 and through a composite material forming process. The composite material forming process indicates a process in which parts of different types are coupled and closely attached to one other through thermal treatment performed at a high temperature.

At an initial operation of forming the tube 120, an end portion of the tube 120 is not formed to be a smooth surface and includes a curved portion, and thus portions of the tube 120 and the connector 110 to come in contact may not be closely attached although the tube 120 of a nonmetal material is coupled with the connector 110 through the Z-pin 111.

Thus, after the connector 110 is coupled with the tube 120 by the Z-pin 111 being inserted in the end portion of the tube 120, the tube 120 is heated at a high temperature through the composite material forming process to allow an end surface of the tube 120 to be closely attached to a corresponding surface of the connector 110 and to allow the Z-pin 111 to be more strongly attached to the nonmetal fibers of the tube 120.

The connector 110 is provided in a state in which the Z-pin 111 is inserted in advance, and the Z-pin 111 is densely inserted along a circumferential direction of the end portion of the connector 110. The number of Z-pins to be used may be determined to allow coupling of the connector 110 and the flange 122 of the tube 120 to be maximal.

A length of the Z-pin 111 extended from the connector 110 needs not to exceed a thickness of the flange 122 of the tube 120.

The Z-pin 111 may be inserted along a circumference of the flange 122 of the tube 120, and the Z-pin 111 may not be inserted in a central portion of the connector 110 which corresponds to the portion connected to the internal hollow space in the end portion of the flange 122 of the tube 120.

Figure 2A:
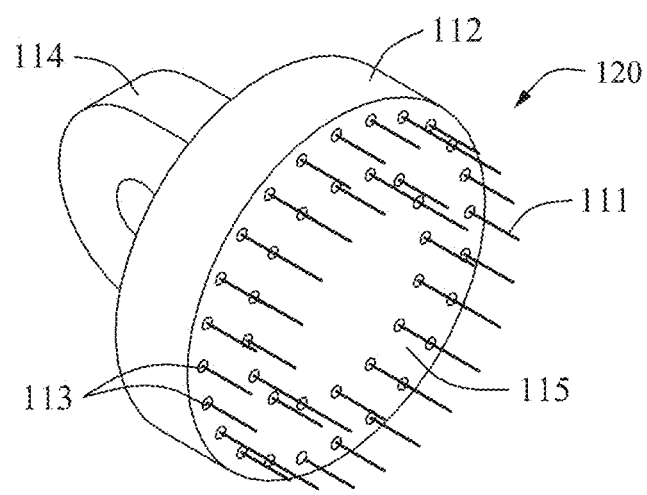
FIG. 2A is a perspective view of a connector according to an embodiment.
Figure 2B:
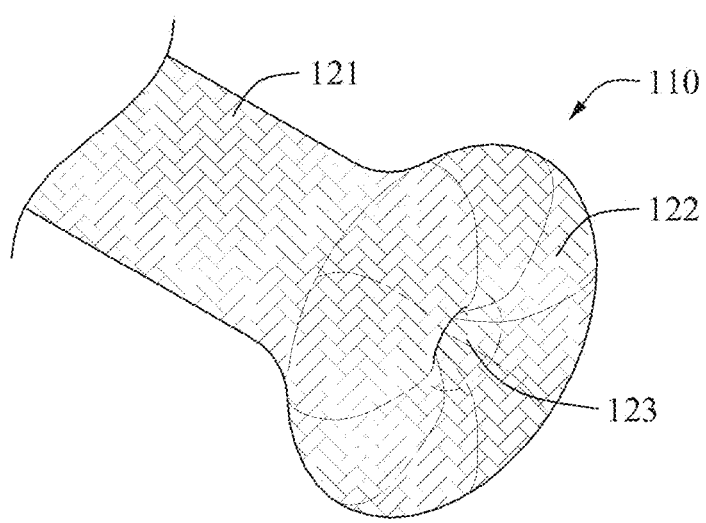
FIG. 2B is a perspective view of a tube according to an embodiment.

FIGS. 2A and 2B are perspective views of the connector 110 and the tube 120, respectively, according to an embodiment. FIG. 2A is a perspective view of the connector 110 in which Z-pins 111 are inserted. FIG. 2B is a perspective view of the tube 120 in which the fibers are braided. The connector 110 may be provided in a flange form.

Although the connector 110 of a metal material may be engaged with the tube 120 using a bolt, the Z-pins 111 may be fixed to the metallic connector 110 through welding and such, and the Z-pins 111 may be inserted in the flange 122 to form the connection.

Referring to FIG. 2A, the connector 110 includes an end portion 112 in a cylindrical form and a connecting member 114 attached to one surface thereof. The Z-pins 111 may be inserted in an end surface 115 along a circumference of the end surface 115. The Z-pins 111 may be arranged along at least two circular lines, or along one circular line.

The end portion 112 of the connector 110 includes Z-pin accommodating grooves 113 to indicate respective locations in which the Z-pins 111 are to be inserted and to facilitate the insertion. The grooves 113 are formed in a shape of end surfaces of the Z-pins 111 for the Z-pins 111 to be smoothly inserted.

Referring to FIG. 2B, the tube 120 includes a column 121 and the flange 122, and further includes a hollow portion 123 internally penetrating the column 121 and the flange 122. The Z-pins 111 of the connector 110 are inserted in an end portion of the flange 122, and the end portion in which the Z-pins 111 are to be inserted needs to be formed as a flat surface to facilitate the insertion.

Here, the Z-pins 111 may not be smoothly inserted if the tube 120 is formed with a metal material as in the connector 110. However, when the braided tube 120 is formed with a carbon fiber material, the Z-pins 111 may be inserted in gaps in the carbon fiber material because the fiber has gaps therein. In addition, since a carbon fiber is elastic, the inserted Z-pins 111 are surrounded by the carbon fiber and receive pressure therefrom. Thus, once the Z-pins 111 are inserted in the tube 120, the Z-pins 111 may not fall out.

The flange 122 is formed by rolling inwards an end of the tube 120 and spreading outwards the rolled end.

According to an example embodiment, in manufacturing a composite material tube, a tube may be formed using a forming method of inserting resin in a woven carbon fiber which is braided in a tube form, instead of using a filament winding method. In detail, a portion to be connected to a connector may be secured by overlapping inwards opposite end portions of the fiber and spreading outwards the portions to be in a flange form.

To prevent damage to the composite material tube 120, a metal skin 127 is provided to cover an outer side of the tube 120 after the tube 120 is coupled with the connector 110 to 20 reinforce impact resistance, or a surface protection agent 129 is provided to coat the tube 120 to reinforce impact resistance.

The nonmetal fibers may include a carbon fiber. The carbon fiber may be obtained by thermally processing an organic fiber in an inert gas at an appropriate temperature and carbonizing and crystallizing the fiber. The carbon fiber, as a graphite carbon, has a suitable mechanical property such as high strength and high stiffness. In addition, the carbon fiber may be manufactured by carbonizing an acrylic fiber as a raw material at a temperature of 1,000 to 1,500° C. in an inert state in which a chemical reaction such as oxidation does not occur.

The carbon fiber may be used as a fiber for a composite material, for example, as a reinforced fiber for a plastic material, due to properties such as high strength and high elasticity. When the carbon fiber is used as a reinforced material, the carbon fiber may be utilized as a carbon fiber-reinforced plastic. The carbon fiber may be used for sports goods such as tennis rackets and golf shafts. In addition, the carbon fiber may be used as a material for a gas structure of a space shuttle due to high heat resistance.

FIG. 3 is a flowchart illustrating a method of manufacturing a coupling body according to an embodiment.

The method of manufacturing the coupling body includes operation 125 of forming a tube by braiding nonmetal fibers, operation 126 of forming a flange by rolling inwards an end of the tube, operation 130 of providing a metallic connector, operation 150 of inserting at least one Z-pin in an end portion of the connector, operation 160 of matching a center of the tube to a center of the connector, and operation 170 of coupling the tube and the connector by inserting the Z-pin in the flange.

Referring to FIG. 3, the operation 125 of forming the tube by braiding the nonmetal fibers includes providing a basic unit fiber by agglomerating a plurality of thin nonmetal fibers, and forming the tube by weaving the basic unit fibers with one another.

To arrange, to be smooth, an outer surface of a portion of the flange in which the tube and the connector are coupled, an end surface of the flange and an end surface of the connector may need to have matching profiles.

When the end surface of the flange and the end surface of the connector have matching profiles, matching the center of the tube to the center of the connector may be more readily performed.

Subsequent to the operation 130 of providing the metallic connector, the method further includes operation 140 of forming a Z-pin accommodating groove to indicate locations of an end portion of the metallic connector in which Z-pins are to be inserted and to facilitate the insertion.

In manufacturing the connector, when using a casting process, a cast may be manufactured to provide the Z-pin accommodating groove in the cast in advance. When using a forging process, the connector may be formed in advance and the Z-pin accommodating groove may be cut therefrom through drilling or milling. Alternatively, a basic form of the connector may be first manufactured and the Z-pins may be welded directly into a surface of the connector.

Figure 4A:
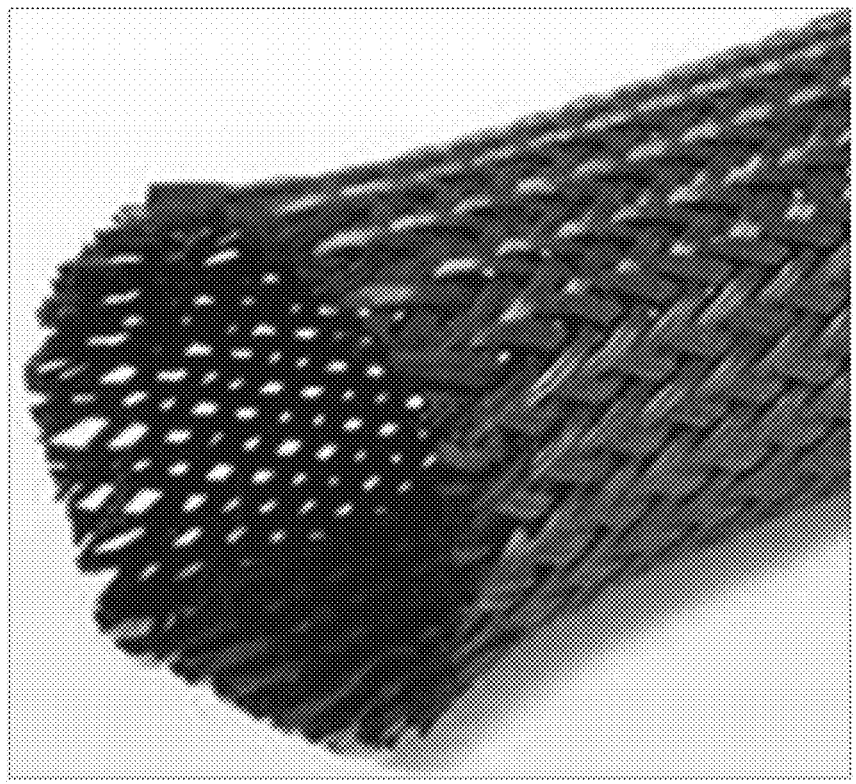
FIG. 4A is an image of a braided tube used for a coupling body according to an embodiment.
Figure 4B:
FIG. 4B is an image of a braided tube used for a coupling body according to an embodiment.

FIGS. 4A and 4B are images obtained by capturing a tube in which nonmetal fibers are braided and used for a coupling body according to an embodiment. FIG. 4A is an image obtained by capturing the tube of a carbon fiber after operation 125 of forming the tube by braiding carbon fibers is terminated, and FIG. 4B is an image obtained by capturing the tube after operation 126 of forming the flange by rolling inwards an end of the tube is terminated. Referring to FIG. 4A, a carbon fiber is used for the tube, and carbon fibers are braided in a zigzag form to provide a tube form.

Referring to FIG. 4B, a space in which Z-pins are to be inserted is arranged in an end surface of the flange. When pressing the tube and the connector after the Z-pins are inserted, coupling therebetween may be further reinforced.

According to example embodiments, a coupling body may be highly productive compared to invested costs for equipment, because braided woven fibers are used to manufacture a composite material tube portion, instead of using a filament winding method.

In addition, structural safety may be improved because stress concentration may not occur in a certain portion of a flange and cutting of a reinforced fiber due to a bolt hole may not occur by using Z-pins, in lieu of a bolt, in a portion connected to the flange and a connector.

Further, a load may be evenly transferred to the portion connected to the flange, and thus weight lightening of the flange portion may be enabled.

According to example embodiments described herein, a coupling body may be used to reduce costs of investment in equipment by using a braided woven product without using a filament winding method to manufacture a composite material tube portion.

In the coupling body, a Z-pin may be used without using a bolt in a portion connected to a flange.

In the coupling body, stress concentration that may be generated in a portion of the flange may be eliminated and cutting of a reinforced fiber due to a bolt hole may be prevented.

In the coupling body, a load may be evenly transferred to the portion connected to the flange, and thus a weight of the flange portion may be reduced Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A coupling body, comprising:
   a tube formed by a plurality of nonmetal fibers being braided with one another, and of which an end portion comprises a flange;
   a metallic connector comprising an end portion corresponding to the flange, and
   at least one Z-pin fixed to the end portion of the connector, wherein the connector and the tube are coupled with the at least one Z-pin extending into the flange end portion of the tube.

2. The coupling body of claim 1, wherein the nonmetal fibers comprise a carbon fiber.

3. The coupling body of claim 1, wherein the end portion of the connector comprises at least one Z-pin accommodating groove into which the at least one Z-pin is inserted.

4. The coupling body of claim 1, wherein the Z-pin is fixed to the end portion of the connector through welding.

5. The coupling body of claim 1, wherein the flange is formed by rolling inwards an end of the tube and spreading outwards the inwardly rolled end of the tube.

6. The coupling body of claim 1, further comprising a metal skin covering an outer side of the tube and the connector in a coupled state.

7. The coupling body of claim 1, further comprising a surface protection agent coated on the tube, where the surface protection agent is applied after the tube and the connector are coupled.

8. The coupling body of claim 1, wherein the end portion of the connector is a flange.

9. A method of manufacturing a coupling body, comprising:
   forming a tube by braiding a plurality of nonmetal fibers;
   forming a flange by rolling inwards an end of the tube and spreading outwards the inwardly rolled end of the tube;
   providing a metallic connector;
   fixing at least one Z-pin to an end portion of the connector; and coupling the tube and the connector by inserting the Z-pin in the flange and performing a composite material forming process.

\* \* \* \* \*